US006893526B2

(12) United States Patent
Maccaferri

(10) Patent No.: US 6,893,526 B2
(45) Date of Patent: May 17, 2005

(54) DEVICE AND METHOD FOR PRODUCING AND APPLYING DECALCOMANIAS

(75) Inventor: Claudio Maccaferri, Modena (IT)

(73) Assignee: G.M.C. S.N.C. di Maccaferri G. & C., Modena (IT)

( * ) Notice: Subject to any disclaimer, the term of this patent is extended or adjusted under 35 U.S.C. 154(b) by 0 days.

(21) Appl. No.: 10/441,995

(22) Filed: May 20, 2003

(65) Prior Publication Data

US 2003/0201063 A1 Oct. 30, 2003

Related U.S. Application Data

(63) Continuation of application No. PCT/EP01/13404, filed on Nov. 20, 2001.

(30) Foreign Application Priority Data

May 13, 2003 (IT) .................................... MO2000A0246

(51) Int. Cl.$^{7}$ ............................ B44C 1/17; B41M 3/12; B32B 31/20; B30B 15/34

(52) U.S. Cl. ....................... 156/230; 156/238; 156/240; 156/277; 156/289; 156/309.9; 156/540; 156/580; 156/583.1; 156/DIG. 1; 156/DIG. 5; 156/DIG. 33; 156/DIG. 36

(58) Field of Search ................................ 156/230, 234, 156/258, 259, 240, 247, 226, 540, 541, 566, 567, 578, 580, 586, 585.1, 272.2, 273.3, 309.9, DIG. 1, DIG. 5, DIG. 33, DIG. 36; 427/146, 147, 148; 428/105, 200, 267, 706, 702, 814

(56) References Cited

U.S. PATENT DOCUMENTS

| | | | | | |
|---|---|---|---|---|---|
| 4,253,904 | A | * | 3/1981 | Jodrey et al. | 156/497 |
| 4,459,170 | A | * | 7/1984 | Kerwin | 156/361 |
| 5,318,660 | A | * | 6/1994 | Olsen et al. | 156/542 |

FOREIGN PATENT DOCUMENTS

| | | | | |
|---|---|---|---|---|
| WO | WO 99/67139 | * | 12/1999 | B65C/9/18 |

* cited by examiner

*Primary Examiner*—J. A. Lorengo
(74) *Attorney, Agent, or Firm*—Thomas R. Vigil; Welsh & Katz, Ltd.

(57) ABSTRACT

The present invention falls into the category of devices designed to print decoration onto objects in general and in particular onto containers. A non-stick film (1), onto which is deposited an image (5) produced using solid thermoplastic colours, moves between a pressing element (4) and an object (6). The action of a heat generator (7) causes the colour to change from a powdery state to a semi-liquid plastic state.

9 Claims, 3 Drawing Sheets

DEVICE AND METHOD FOR PRODUCING AND APPLYING DECALCOMANIAS

This application is a continuation of international application number PCT EP01/13404, filed Nov. 20, 2001 (status, abandoned, pending, etc.).

BACKGROUND OF THE INVENTION

1. Technical Field

The present invention relates to a device for decorating objects, in particular containers, and the relative procedure.

2. Background Art

Various procedures are used to decorate, in particular but not exclusively, containers regardless of the shape of said containers. A first procedure is currently used which consists in the screen printing technique: in this decoration system the liquid ink is forced, by means of a spatula or similar, to pass through the thickness of an element, called a mesh, the surface of said mesh having portions which are blocked and others which are not. By alternating these blocked portions as necessary, the passage of the ink through the mesh is controlled and only permitted through clearly and intentionally defined areas of the said mesh, resulting in the decoration wanted.

A further commonly known procedure consists in the offset printing technique, which consists in a derivation of lithographic printing technique. Like in screen-printing, this procedure also uses ink made liquid by means of the addition of suitable solvents.

The said offset printing technique uses zinc and aluminum plates onto which the images to be printed onto the object to be decorated is reproduced. The decorative image is produced on the surface to be decorated by means of a rubberized fabric.

A further commonly known procedure consists in the buffer technique, wherein the decorative image is produced on the object by means of a buffer and also in this case, like in the other two cases described, a liquid ink is used.

A still further procedure currently used is the so-called "heat transfer" method: in this procedure the decorative image is transferred onto a backing which has been already treated with a suitable detachable material, the material being technically pointed out with the word "release" and, the said transfer of the image being realized by means of either a screen printing procedure or a lithographic procedure: the printing of the image onto the object to be decorated occurs by the said backing being pressed against the object with the backing being heated contemporaneously.

All the commonly known procedures just described have drawbacks, some typical of a given procedure, others common to all the procedures.

In particular, one drawback of the screen-printed technique consists in the limited accuracy of the print, which is a direct consequence of the minimal possible dimensions of the mesh, or more precisely the minimal possible surface dimensions of the holes in the surface of the said mesh.

A further drawback of the current screen-printing technique, which also limits the accuracy of the decoration, is due to the need for the colour to be deposited in the sequence, in particular in the four-colour printing technique, and even more so in the six-colour printing technique, the said following colour depositions generating a non-uniform thickness of the decorative print.

A drawback which is common to the screen-printing, offset printing and the buffer procedures is the need to make the ink deposited on the object to be decorated dry as in all three cited procedures the ink used must be in a liquid state. This drawback leads to an increase in the production times and an increase in the decoration costs.

A first drawback common to all printing systems described earlier consists in the difficulty involved in the production of colour shading. This difficulty derives, in general, from the complexity of the plate regulation and, in the particular case of screen-printing, from the aforesaid limited surface dimensions that are possible for the holes in the mesh surface.

A second drawback common to all the printing systems described earlier is the complexity and the high cost of the preparation of the plates, this drawback generating, as a consequence, a further consistent need for a large quantity of objects to be decorated in order to amortize the production costs for the said plates.

A further drawback, which is common to all the printing systems described earlier, is the toxicity of the solvents used in both the ink dilution phase and also the equipment cleaning phase.

3. Disclosure of Invention

A first aim of the present invention is to produce decorations with a very high printing quality and accuracy with the resolution of the images depending only on the quality of the electrostatic printer used that is of a kind commonly available.

A further aim of the present invention consists in the possibility to obtain colour variations and shading to keep the thickness of the print almost unchanged, all of which are prerogatives which depend only on the quality of the electrostatic printer used.

A further aim of the present invention is to obtain a reproduction of the decoration using dry inks, with no solvents.

A still further aim of the present invention consists in the absence of drying stations for the decorations which have just been printed and also the elimination of the minimum production quantity.

All of the aims listed above can be achieved regardless of the geometric configuration of the surfaces to be decorated and regardless of the dimensions of the object having the aforesaid surface.

In particular, the device in question in the present invention for decorating objects, in particular, containers in general, is of the type comprising at least two reels, at least one of which is motorized, to which the ends of a non-stick film are connected, the non-stick film being made of a paper material or a polyester material covered with silicon on both surfaces, one of the surfaces acting as a support for a plurality of images, at least two tension rollers for the non-stick film at least one pressing element positioned between the tension rollers, and at least one heat generator which has a heat dispenser directed towards the non-stick film.

These and other characteristics will better emerge in the description that follows of a preferred embodiment illustrated, in the form of a non-limiting example, in the drawing plates attached, in which.

DETAILED DESCRIPTION OF THE INVENTION

Figure 1:
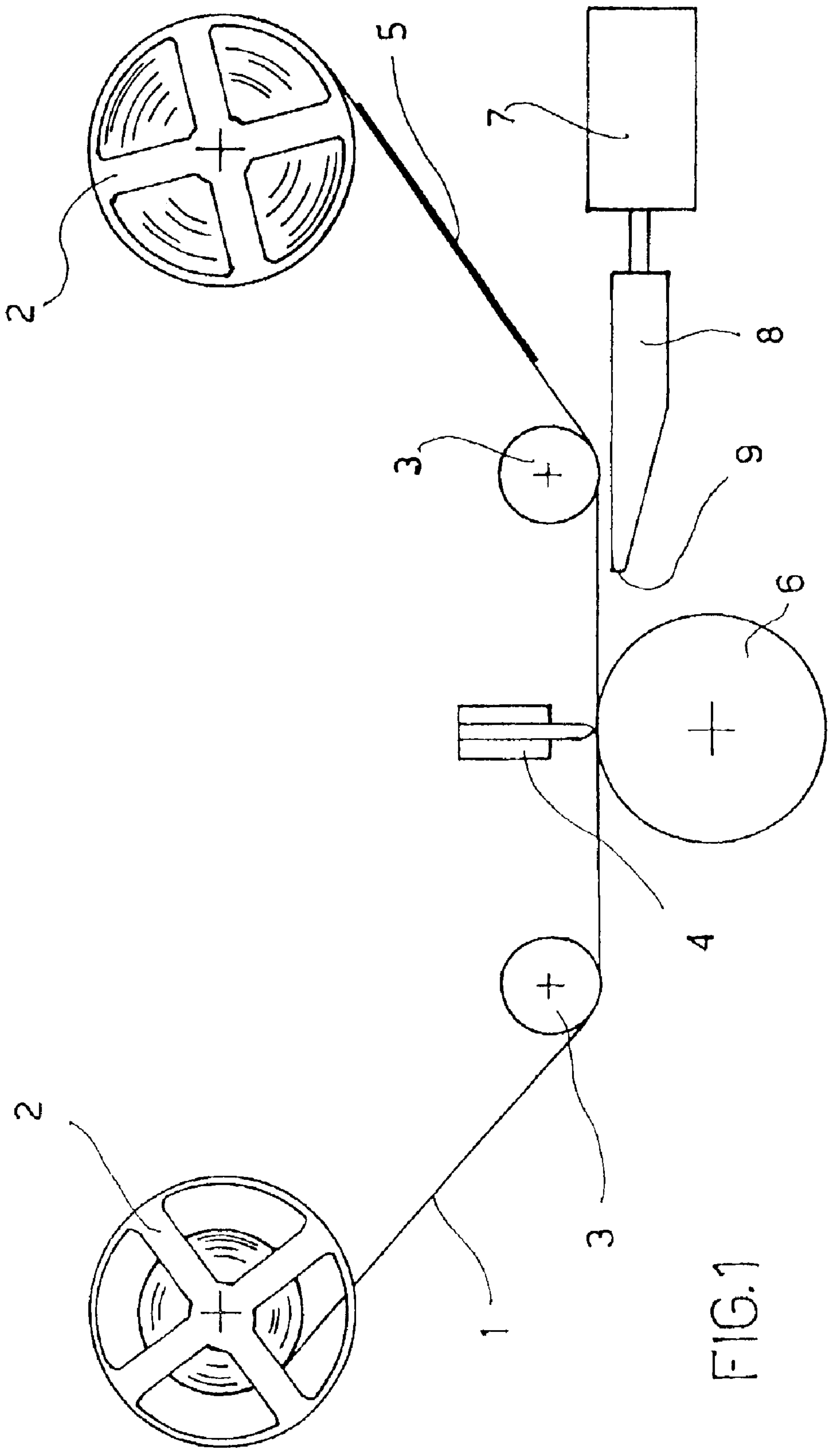
FIG. 1 shows a schematic view of a device for the application of decorations wherein a jet of hot air is directed towards the surface of a non-stick film onto which is deposited a plurality of images to be reproduced onto objects with surfaces to be decorated around the circumference of the objects.

With reference to the figures, 1 is used to denote a non-stick film, designed to be reeled around a spool, composed of commonly known non-stick material, a paper, material covered with silicon or a polyester type material covered with silicon.

The film is contained between the two reels 2 of which at least one is motorized.

The film 1, in the gap between the two cited reels, is held taut by two tension rollers 3.

Positioned between the two rollers is a pressing element 4 capable of causing a springy, orthogonal movement with respect to the section of film 1 held taut between the two tension rollers 3.

An image 5, designed to be reproduced on the surface of an object 6 is deposited on the surface of the non-stick film 1 directed towards the exterior of the unit constituted of the two tension rollers 3 and the element 4 of one of the surfaces of backing 1.

Placed opposite the element 4, is the object 6, one of whose surfaces the image 5, is to be reproduced on.

A heat generator 7, generating, for example hot air, has a dispenser 8 whose outlet 9 is directed towards the backing 1.

In the FIG. 1, this hot air dispenser outlet is directed towards the surface of the film 1 onto the image 5 has already been deposited using a commonly known technique realized by means of a common electrostatic printer. The positioning of the outlet 9 illustrated in the figure is used to decorate oversized objects 6 capable of rotating around their own axis of rotation and which have rather consistent thicknesses that guarantee their resistance to the high temperatures and prevent deformations.

Figure 2:
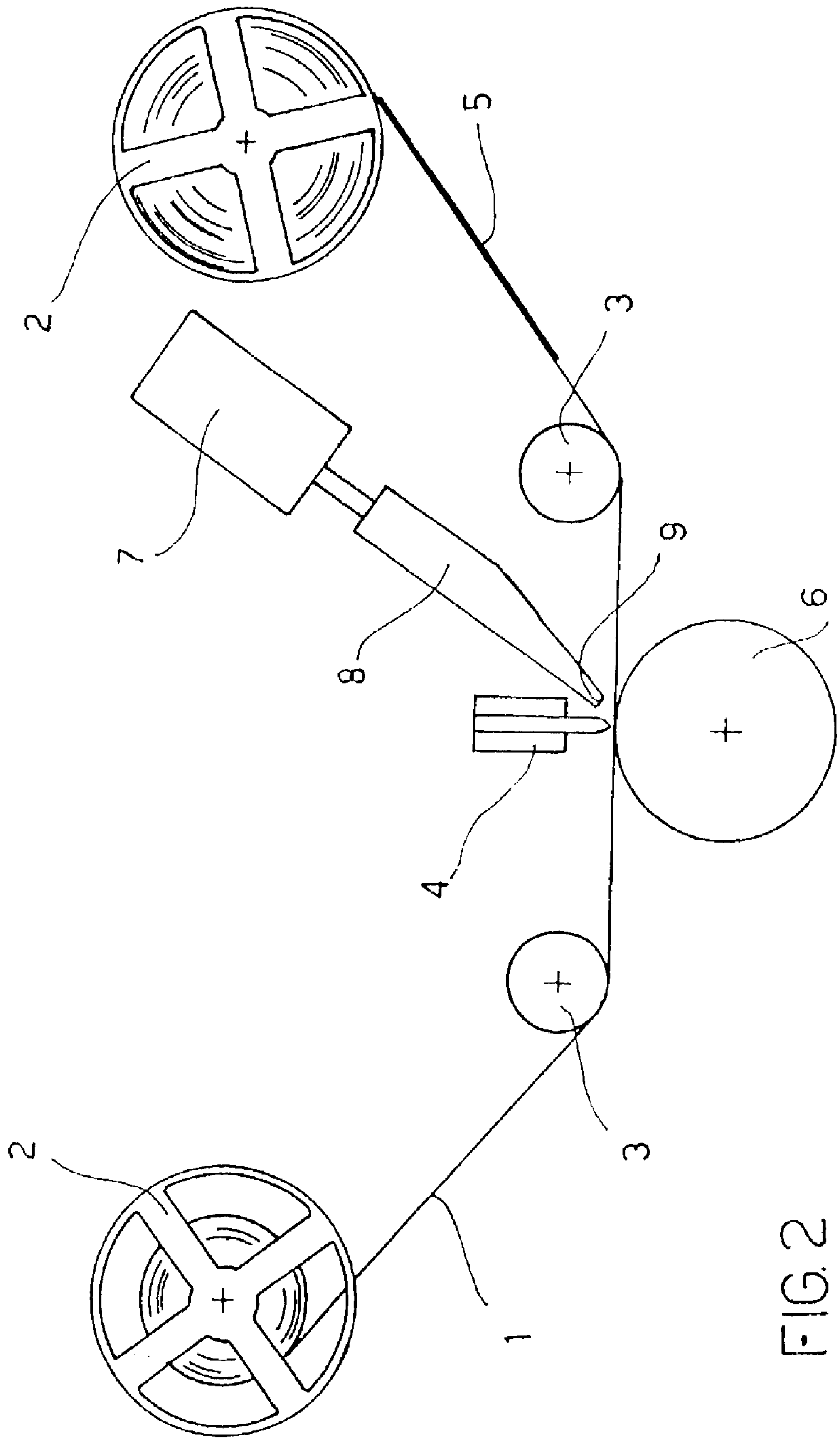
FIG. 2 shows the contents of the previous figure wherein the jet of hot air is directed towards the surface of the non-stick film opposite to that on which the images are deposited.
Figure 3:
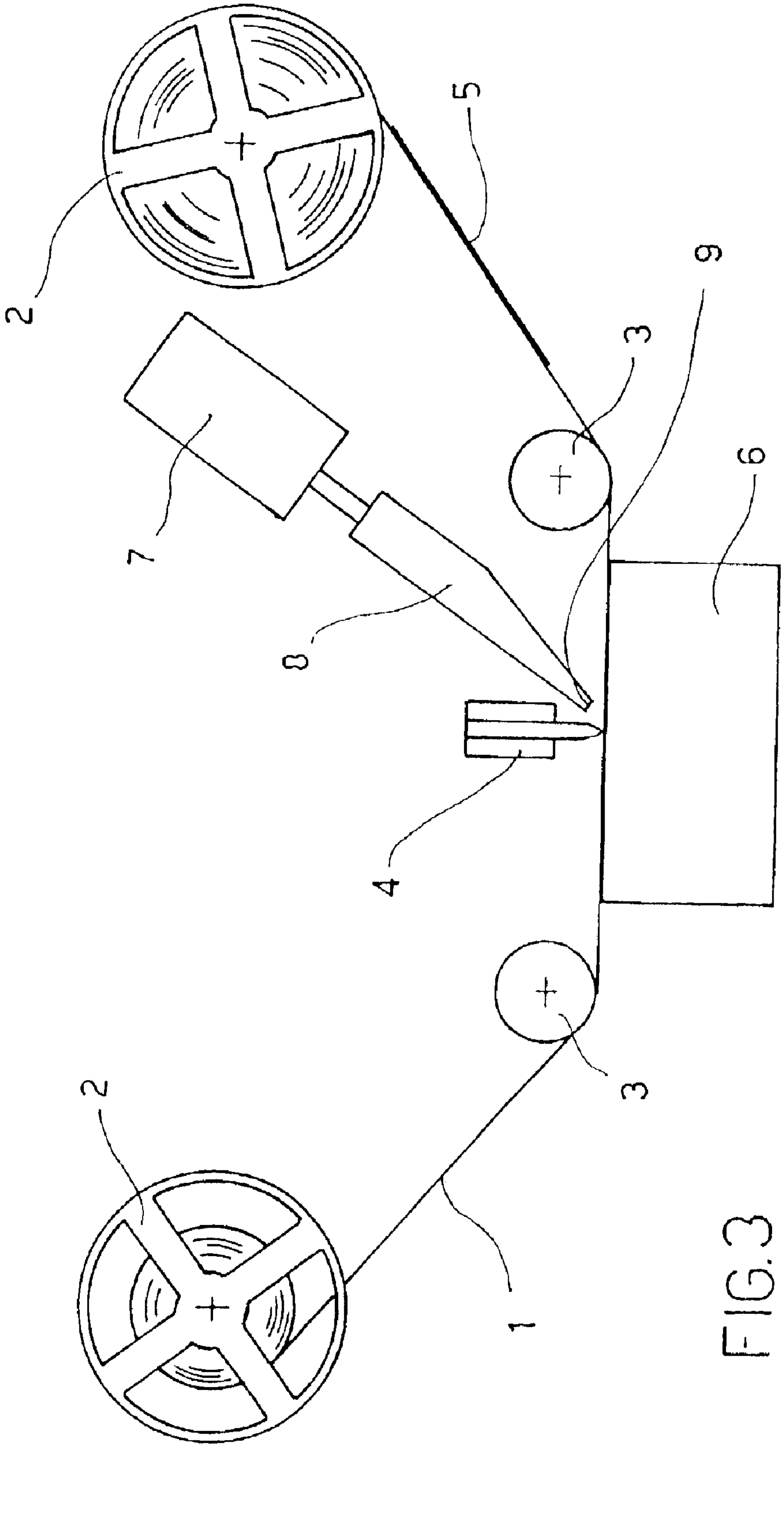
FIG. 3 shows the contents of FIG. 2 wherein the object has surfaces to be decorated that are flat in shape.

In FIGS. 2 and 3, however, the outlet 9 is directed towards the surface of the film opposite the surface onto which the image is deposited. This positioning of the outlet 9 corresponds, respectively, with the case of small objects and/or those of scarce thickness and objects with a flat or elliptic form.

There will now follow a description of the functioning of the system which is the object of present invention using the references indicated in the figures.

After positioning the object 6 to be decorated on a special base (not shown), when the reels 2 begin to rotate, the feeding of the image 5 towards the tension rollers 3 begins and the hot air released from the outlet 9 of the dispenser 8 begins to hit the film 1 in the portion of the film contained between the two tension rollers.

Contemporaneously, a pressing element 4 presses the non-stick film 1 against the object 6; such pressure ensures the feeding movement of the film causes the simultaneous rotation of the object if its surface is in contact with the non-stick film 1 whose surface is shaped around the circumference and is as illustrated in FIGS. 1 and 2.

By continuing the rotation of the reels 2, the image 5 begins to cover the contact zone of the pressing element 4 and the object 6.

The hot air jet transforms the dry thermoplastic colour powder into a semi-liquid plastic and, in this way, the colour in the plastic state is transferred, by heat, from the non-stick film 1 onto the surface of the object to be decorated. The pressure exerted by the pressing element 4 against the non-stick film 1 in position with the object 6, makes the colour adhere to the surface to be decorated.

Thanks to the rotation of the object 6 contemporaneously with the feeding of the image 5, the decoration covers the entire portion of the surface of the object 6 required to be decorated.

If the surface of the object 6 to be decorated is substantially flat in shape, the pressing element 4 is capable of translating parallel with the portion of the non-stick film 1 held between the two tension rollers 3.

If the object 6 to be decorated is constituted by a container having particularly thin sides, controlled pressurized air can be blown into the container to guarantee the rigidity of the thin sides when pressure is exerted by the pressing element 4 during the phase when the non-stick film 1 is applied to the surface of the container to be decorated.

A first advantage of the present invention consists in the fact that no plate of kind is required for the production of the images since these are realized using electrostatic printers of a kind commonly available in sales outlets.

A further advantage is the fact that the present invention makes it possible to avoid using any kind of solvent, for both diluting the ink and cleaning the device. In fact, the inks uses are the dry kind and therefore do not need to be diluted and do not run during the printing phase.

A still further advantage, also derived from the use of dry inks, consists in the fact that the procedure in question in the present invention eliminates the need for working phases involving the drying of the ink used.

A still further advantage of the present invention consists in the possibility of obtaining notable color tonal variations and shading, together with an almost constant print thickness.

A still further advantage consists in the possibility of using the invention on the premises of manufacturers of containers designed for food product uses since there are absolutely no solvents in the inks used.

A further, but not last, advantage consists in the fact that the resolution and the type of the images depend solely on the quality of the electrostatic printer used, which is of a kind commonly available in the shops.

An important advantage consists in the considerable reduction in the production cost if the graphics of the image are changed: a consequence is the elimination of the minimum production quality obligation.

All the aforesaid advantages can be obtained regardless of the shape of the surface of the object (6) to be decorated, which may be, for example, flat, cylindrical, a truncated cone, ellipsoidal or similar, regardless of the dimensions of the object itself.

What is claimed is:

1. A method for decorating objects, in particular containers in general, using a device comprising at least two reels, at least one of which is motorized, to which the ends of a non-stick film are connected, the non-stick film being made of one of a paper material or a polyester material covered with silicon on both surfaces, one of said surfaces acting as a support for a plurality of images created from dry thermoplastic ink, at least two tension rollers for the non-stick film, at least one pressing element positioned between the tension rollers, and at least one heat generator which has-a heated air dispenser directed towards the non-stick film, said method comprising the steps of: electrostatic application of dry thermoplastic inks to the non-stick film, the application being designed to form an image which will constitute the decoration of the object, a transformation on the surface of a non-stick film of a thermoplastic ink of the image from a dry powdery state to a semi-liquid plastic state through the action of heated air blown from a heat generator against the non-stick film that causes a detaching of the images from the non-stick film and an adhesion of the image to the surface of the object to be decorated, the adhesion occurring as a result of the action of mechanical pressure exerted by a pressing element on the non-stick film against the surface of the object to be decorated, and of the images which are exposed to the heating effect of the hot air from the heat generator, being able to effect the adhesion of the images on the objects to be decorated followed by subsequent solidification of the inks of the images on the object as the images cool and a dispenser is positioned on the side of the surface of non-stick film bearing the images or on the opposite side; the positioning being variable according to the variable resistance to the temperature of the material constituting the object to be decorated; the variable positioning of the dispenser making the decoration procedure free of restrictions of a chemical nature of the surfaces of the object to be decorated.

2. A procedure for decorating objects according to the claim 1, being able to decorate objects which can have any shape and regardless of the dimensions of the objects.

3. A procedure for decorating objects according to the claim 1, being able to use a low priced, non-stick film which is devoid of release between the images and the non-stick film and devoid, also, of any adhesive material on the exposed surfaces of the images.

4. A device for decorating objects, in particular containers in general of the type comprising at least two reels, at least one of which is motorized, to which the ends of a non-stick film are connected, the non-stick film being made of one of a paper material or a polyester material covered with silicon on both surfaces, one of said surfaces acting as a support for a plurality of images created from dry thermoplastic ink, at least two tension rollers for the non-stick film, at least one pressing element positioned between the tension rollers, and at least one heat generator which has-a heated air dispenser directed towards the non-stick film, the images being adhered to the objects to be decorated as the images are pressed by the pressing element onto the objects and subsequently the inks of the images solidify as the images cool, and, when the objects have smaller dimensions and/or scarce thickness, with either flat walls or substantially elliptical walls, the dispenser of the heated air from the heat generator is directed towards the opposite surface of the non-stick film to the surface on which the images are deposited.

5. A device for decorating objects according to claim 4, wherein the images deposited on a non-stick film comprise only images made of dry thermoplastic inks deposited on the film; the film being devoid of release between the images and the non-stick film.

6. A device for decorating objects according to claim 4, wherein the images deposited on the non-stick film have their exposed surfaces devoid of any adhesive material.

7. A device for decorating objects according to claim 4, characterized in that the device is usable to decorate objects which can have any shape regardless of the dimensions of the objects.

8. A method for decorating objects, in particular containers in general, using a device comprising at least two reels, at least one of which is motorized, to which the ends of a non-stick film are connected, the non-stick film being made of one of a paper material or a polyester material covered with silicon on both surfaces, one of said surfaces acting as a support for a plurality of images created from dry thermoplastic ink, at least two tension rollers for the non-stick film, at least one pressing element positioned between the tension rollers, and at least one heat generator which has-a heated air dispenser directed towards the non-stick film, said method comprising the steps of: electrostatic application of dry thermoplastic inks to the non-stick film, the application being designed to form an image which will constitute the decoration of the object, a transformation on the surface of a non-stick film of a thermoplastic ink of the image from a dry powdery state to a semi-liquid plastic state through the action of heated air blown from a heat generator against the non-stick film that causes a detaching of the images from the non-stick film and an adhesion of the image to the surface of the object to be decorated, the adhesion occurring as a result of the action of mechanical pressure exerted by a pressing element on the non-stick film against the surface of the object to be decorated, and of the images which are exposed to the heating effect of the hot air from the heat generator, being able to effect the adhesion of the images on the objects to be decorated followed by subsequent solidification of the inks of the images on the object as the images cool the objects to be decorated having surfaces which are substantially flat in shape and the pressing element being arranged to translate substantially parallel with the portion of the non-stick film held between the two tension rollers.

9. A device for decorating objects, in particular containers in general of the type comprising at least two reels, at least one of which is motorized, to which the ends of a non-stick film are connected, the non-stick film being made of one of a paper material or a polyester material covered with silicon on both surfaces, one of said surfaces acting as a support for a plurality of images created from dry thermoplastic ink, at least two tension rollers for the non-stick film, at least one pressing element positioned between the tension rollers, and at least one heat generator which has-a heated air dispenser directed towards the non-stick film, the images being adhered to the objects to be decorated as the images are pressed by the pressing element onto the objects and subsequently the inks of the images solidify as the images cool, the objects to be decorated having a substantially flat surface and the pressing element being capable of movement in a substantially straight path of movement which is substantially parallel with the portion of the non-stick film held between the tension rollers.

* * * * *